W. A. BERNARD.

CUTTING PLIERS.

Reissued Dec. 16, 1913. 13,657.

APPLICATION FILED NOV. 11, 1913.

Witnesses:
Mary E. Fuller.
M. Olive Williams

Inventor:
William A. Bernard,
by Beach & Fisher
Attys.

COLUMBIA PLANOGRAPH CO., WASHINGTON, D. C.

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

CUTTING-PLIERS.

13,657. Specification of Reissued Letters Patent. Reissued Dec. 16, 1913.

Original No. 1,077,789, dated November 4, 1913, Serial No. 732,551. Application for reissue filed November 11, 1913. Serial No. 800,693.

*To all whom it may concern:*

Be it known that I, WILLIAM A. BERNARD, a citizen of the United States, residing in the city and county of New Haven, State of Connecticut, have invented certain new and useful Improvements in Cutting-Pliers, of which the following is a full, clear, and exact description.

This invention relates to pliers and tools of a similar type having pivoted handles, and more particularly to tools in which the main jaws have the so-called parallel movement.

One of the objects of the invention is to provide a tool of this kind having an end cutter formed of a cutting edge on the outside of one of the main jaws coöperating with a cutting edge on an auxiliary or subsidiary jaw. It is also proposed to combine an end cutter and a side cutter in a novel and superior manner. Furthermore, in accordance with my invention, the end cutter is so constructed and arranged that the wire to be cut can be very easily and conveniently inserted therein, whether in short or long lengths, and the construction is such that the operating force applied to the handles of the tool is so transmitted to the subsidiary or auxiliary jaw that all portions of its end cutting edge will have a uniformly strong biting action by avoiding any tendency which the subsidiary jaw might have to become twisted with respect to the handles. By the improved construction the operating force is transmitted directly and uniformly to the end cutter as well as to the side cutter.

To these and other ends the invention consists in the novel features and combinations of parts to be hereinafter described and claimed.

Figure 1:
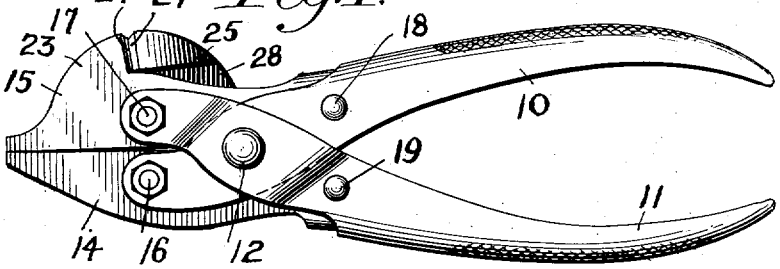
Figure 2:
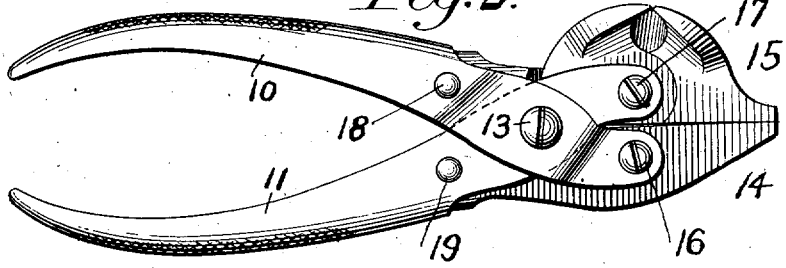
Figure 3:
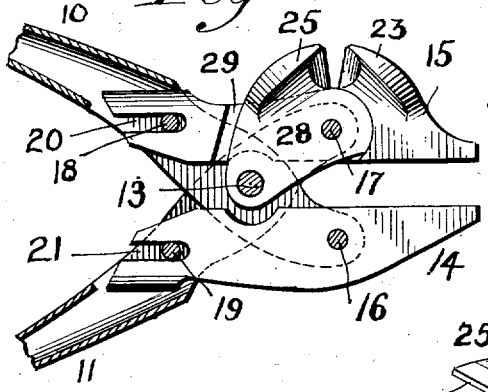
Figure 4:
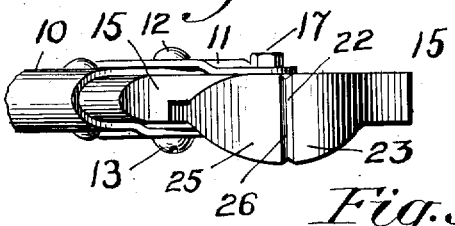
Figure 5:
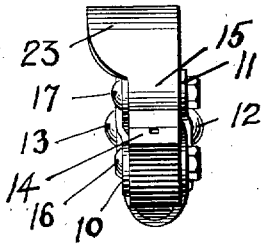
Figure 6:
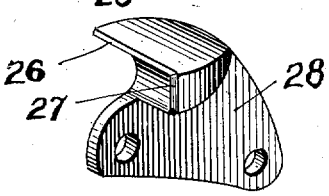

In the accompanying drawing, Figure 1 is a side elevation of a tool embodying the invention showing the same in its closed position, Fig. 2 is a similar view from the opposite side of the tool, Fig. 3 is a detail longitudinal section showing the position of the parts when the jaws are open, Fig. 4 is a top plan view of a portion of Fig. 2, Fig. 5 is a front end view of Fig. 2, and Fig. 6 is a detail perspective view of the pivoted cutting jaw.

Referring to the drawing, the handles 10 and 11 of the tool are forked at their forward portions as usual, and these forked portions are crossed and pivoted together by means of separate pivots 12 and 13 at opposite sides of the tool. In other words, the side portion or tine of one fork is pivoted to the adjacent side portion or tine of the other handle by a separate pivot at one side of the tool and the same arrangement is adopted at the opposite side. The plier jaws are shown at 14 and 15 respectively and these jaws are mounted for parallel movement in the well known way by means of pivots 16 and 17 at the forward extremities of the handles and guide pins 18 and 19 carried by the respective handles at the rear of the pivots 12, 13 and engaging slots 20, 21 at the rear ends of the respective parallel jaws. This manner of mounting the plier jaws is old and well known and need not be described in further detail.

In accordance with the present invention, the jaw 15 is provided at its outer part *i. e.* at the side opposite its inner working surface, with an enlargement 23 which overhangs the jaw on one side and is provided throughout its length with a cutting edge 22. At the side of the jaw 15 opposite the overhanging portion thereof said jaw is provided with a cutting edge 24 located approximately flush with or in the plane of the side of the jaw and of the tool and approximately at right angles to the cutting edge 22. The cutting edges 22 and 24 preferably meet at 90 degrees, as shown, but this is not essential in all aspects of the invention. The edge 22 is substantially parallel to the main pivotal axis of the tool and is termed an end cutting edge, whereas the edge 24 is substantially perpendicular to such axis and is termed a side cutting edge. Coöperating with the cutting edges 22 and 24 of the main jaw 15 is a pivoted subsidiary jaw 25 mounted on and movable about the pivot screw 13. This jaw 25 is formed to correspond with the coöperating portion of the jaw 15, that is to say, its working portion is shaped generally to correspond with the enlarged portion 23. The end cutting edge to coöperate with the end cutting edge 22 of the main jaw is shown at 26 and the side cutting edge to coöperate with side cutting edge 24 of the main jaw is shown at 27. The shank portion 28 of the pivoted jaw 25 consists of a flat plate housed in a suitable recess 29 at one side of the jaw 15, in which recess said shank portion is arranged to work pivotally about the pivot 13 by means of which the lever handles are pivoted together, the opposite end of said shank portion being pivoted on the pivot 17 by means of which the forward extremity of the handle 11 is pivoted to the jaw 15.

The operation of the tool will be obvious for the most part from the foregoing description. When the main jaws 14, 15 are separated by a pivotal movement of the handles the pivot 17 will be moved farther away from the median line or longitudinal axis of the tool, thereby moving the jaw 25 about the pivot 13 and separating it from the coöperating portion of the jaw 15, whereby the cutting edges of the end and side cutters are moved away from each other. On closing the tool by pressing together the lever handles a reverse movement of the jaw 25 will take place and the same will have its cutting edges brought into contact with the respective cutting edges of the main jaw 15 at the moment that the working portions of the main jaws are brought into contact with each other. The function of the side cutter formed by the cutting edges 24, 27 will be obvious, and it will also be readily understood that the end cutter formed by the cutting edges 22, 26 will not only cut small lengths of wire or other material inserted between the edges 22, 26 in line with the jaw 15, but will also cut long lengths of wire or other material which are passed through the overhanging laterally projecting portions of the jaws 23, 25 at one side of the tool. In other words the overhanging portions of the cutting edges 22, 26 are of such length as to cut wires of different thicknesses which are inserted between said edges in such a manner as to lie transversely across the main jaws immediately adjacent to those ends of the pivots 16, 17 which are shown in Fig. 2.

It is important to note that the cutting edge 26 of the pivoted jaw 25 is distributed about equally on opposite sides of the shank 28 of said jaw, as shown in Fig. 4. In this manner the operating force is transmitted to the middle portion of the cutting edge rather than to one end of the same, and all twisting of the jaw 25 with respect to the handles is prevented by locating the shank 28 at that side of the jaw 15 which is opposite the side cutter. By this arrangement, it is an easy matter to extend the main portion of the jaw 25 to substantially the same distance on opposite sides of the median longitudinal plane of the shank so that just as much force will be transmitted to the laterally overhanging portion of the end cutting edge 26 as is transmitted to the side cutting edge 27.

It will be readily understood that the invention is not limited to a tool in which the jaws 14, 15 or their equivalents are plier jaws. Numerous modifications in this and other respects may be made within the scope of the appended claims.

What I claim is:

1. In a tool such as described, a main pair of jaws, a pivoted subsidiary jaw having a side cutting edge substantially flush with a side of one of said main jaws, and provided with an end cutting edge extending transversely of said main jaw at the outside of the latter and meeting said side cutting edge, cutting edges on said main jaw to coöperate with the respective first named cutting edges, and means to operate said jaws; substantially as described.

2. In a tool such as described, a main pair of jaws, a pivoted subsidiary jaw having a side cutting edge substantially flush with a side of one of said main jaws, and provided with an end cutting edge extending transversely of said main jaw at the outside of the latter and meeting said side cutting edge, cutting edges on said main jaw to coöperate with the respective first named cutting edges, and means to operate said jaws, the end cutting edges of said main jaw and subsidiary jaw overhanging said main jaw at one side; substantially as described.

3. In a tool such as described, a main pair of jaws provided with coöperating inner working faces, one of said jaws having at the edge or side opposite its working face an enlargement presenting a transverse cutting edge extending across the jaw and overhanging the same at the side, a subsidiary jaw pivoted to said main jaw and provided with a cutting edge to coöperate with said first named cutting edge, and means for operating said jaws; substantially as described.

4. In a tool such as described, the combination of a pair of parallel main jaws, pivoted handles for operating the same, one of said jaws having at the side thereof a cutting edge, a subsidiary jaw pivoted to said main jaw at the side opposite said cutting edge and having a cutting edge coöperating with the latter, and means for operating said subsidiary jaw as the main jaws are moved toward and away from each other; substantially as described.

5. In a tool such as described, a pair of parallel main jaws, one of said jaws having on the outside thereof a transversely extending cutting edge overhanging said jaw at one side, pivoted handles to operate said jaws, a subsidiary jaw pivoted to the main jaw having said cutting edge at the same side as the overhanging portion of said cutting edge, said subsidiary jaw having a cutting edge to coöperate with that of the main jaw, and means to operate said subsidiary jaw as the main jaws are operated; substantially as described.

6. In a tool such as described, a pair of parallel main jaws having inner working faces, one of said jaws having an end cutting edge at the side opposite the working face, and provided with a side cutting edge meeting said end cutting edge, a subsidiary jaw having a shank pivoted to said main jaw at the side opposite said side cutting edge, and provided with cutting edges to coöperate with both of said first named edges, and means to operate said subsidiary jaw as the main jaws are operated; substantially as described.

7. In a tool such as described, a pair of parallel main jaws having inner working faces, one of said jaws having an end cutting edge at the side opposite the working face, and provided with a side cutting edge meeting said end cutting edge, a subsidiary jaw having a shank pivoted to said main jaw at the side opposite said side cutting edge, and provided with cutting edges to coöperate with both of said first named edges, and means to operate said subsidiary jaw as the main jaws are operated, the end cutting edges of said main jaw and subsidiary jaw respectively overhanging said main jaw at the side opposite said side cutting edge; substantially as described.

8. In a tool such as described, a pair of parallel main jaws having inner working faces, one of said jaws having an end cutting edge at the side opposite the working face, and provided with a side cutting edge meeting said end cutting edge, a subsidiary jaw having a shank pivoted to said main jaw at the side opposite said side cutting edge, and provided with cutting edges to coöperate with both of said first named edges, and means to operate said subsidiary jaw as the main jaws are operated, the end cutting edges of said main jaw and subsidiary jaw respectively overhanging said main jaw at the side opposite said side cutting edge, and the end cutting edge of said subsidiary jaw being distributed about equally on opposite sides of the shank of said jaw; substantially as described.

In witness whereof, I have hereunto set my hand on the 19th day of November, 1912.

WILLIAM A. BERNARD.

Witnesses:
HENRY E. ROCKWELL,
M. OLIVE WILLIAMS.

Copies of this patent may be obtained for five cents each, by addressing the "Commissioner of Patents, Washington, D. C."